(12) United States Patent
Renan et al.

(10) Patent No.: US 10,613,751 B2
(45) Date of Patent: Apr. 7, 2020

(54) COMPUTING SYSTEM WITH INTERFACE MECHANISM AND METHOD OF OPERATION THEREOF

(71) Applicant: Telenav, Inc., Sunnyvale, CA (US)

(72) Inventors: Michael David Renan, Culver City, CA (US); Lucas Dickey, Los Angeles, CA (US)

(73) Assignee: Telenav, Inc., Santa Clara, CA (US)

( * ) Notice: Subject to any disclaimer, the term of this patent is extended or adjusted under 35 U.S.C. 154(b) by 361 days.

(21) Appl. No.: 14/317,174

(22) Filed: Jun. 27, 2014

(65) Prior Publication Data
US 2015/0378597 A1    Dec. 31, 2015

(51) Int. Cl.
*G06F 3/048*    (2013.01)
*G06F 3/0488*   (2013.01)
*G06F 3/01*     (2006.01)

(52) U.S. Cl.
CPC ................. *G06F 3/04886* (2013.01)

(58) Field of Classification Search
CPC .... G06F 3/04886; G06F 16/94; G06F 17/212; G06F 9/5072; G06F 16/9024
See application file for complete search history.

(56) References Cited

U.S. PATENT DOCUMENTS

| | | | | |
|---|---|---|---|---|
| 7,672,778 B1 * | 3/2010 | Elliott | ................... | G01C 21/32 701/417 |
| 8,199,126 B1 * | 6/2012 | Taubman | ................ | G06F 3/011 345/156 |
| 2002/0180811 A1 | 12/2002 | Chu | | |
| 2011/0145228 A1 * | 6/2011 | Laurenzo | ................ | G01C 21/32 707/723 |
| 2011/0208852 A1 * | 8/2011 | Looney | ................... | G06Q 20/10 709/223 |
| 2012/0324403 A1 * | 12/2012 | Van De Ven | ......... | G06F 3/0488 715/863 |
| 2013/0073988 A1 * | 3/2013 | Groten | ................... | G06Q 30/02 715/753 |
| 2013/0265269 A1 | 10/2013 | Sharma et al. | | |
| 2014/0058841 A1 * | 2/2014 | Getchius | ................ | G06Q 30/02 705/14.58 |
| 2014/0282007 A1 * | 9/2014 | Fleizach | ............... | G06F 3/0487 715/728 |
| 2014/0282136 A1 * | 9/2014 | Marantz | ................... | G06F 16/17 715/764 |
| 2014/0337546 A1 * | 11/2014 | Kitahama | ................. | G06F 3/02 710/73 |
| 2015/0168150 A1 * | 6/2015 | Kahn | ...................... | H04W 4/21 701/408 |
| 2015/0169285 A1 * | 6/2015 | Reyes | ..................... | G06F 3/167 715/728 |

(Continued)

FOREIGN PATENT DOCUMENTS

WO    WO2011106673    9/2011

*Primary Examiner* — Nicholas Augustine
(74) *Attorney, Agent, or Firm* — Perspectives Law Group, Corp.

(57) ABSTRACT

A method of operation of a computing system includes: providing a zone area including a zone segmentation; determining a zone placement of the zone area with a control unit for detecting a user entry on a display interface; and providing an intent zone including a high intent area, a low intent area, or a combination thereof based on the zone placement for displaying on a device.

20 Claims, 6 Drawing Sheets

(56) References Cited

U.S. PATENT DOCUMENTS

2015/0186377 A1* 7/2015 James ............... G06F 16/24578
707/726
2015/0362988 A1* 12/2015 Yamamoto ............. G06F 3/011
345/156

* cited by examiner

COMPUTING SYSTEM WITH INTERFACE MECHANISM AND METHOD OF OPERATION THEREOF

TECHNICAL FIELD

The present invention relates generally to a computing system, and more particularly to a system with interface mechanism.

BACKGROUND ART

Modern portable consumer and industrial electronics, especially client devices such as computing systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Computing systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a computing system without interface mechanism to switch for guidance relevant to the user has become a paramount concern for the consumer. The inability decreases the benefit of using the tool.

Thus, a need still remains for a computing system with interface mechanism to provide guidance optimal to the user. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a computing system including: providing a zone area including a zone segmentation; determining a zone placement of the zone area with a control unit for detecting a user entry on a display interface; and providing an intent zone including a high intent area, a low intent area, or a combination thereof based on the zone placement for displaying on a device.

The present invention provides a computing system, including: a control unit for: providing a zone area including a zone segmentation, determining a zone placement of the zone area with a control unit for detecting a user entry on a display interface, providing an intent zone including a high intent area, a low intent area, or a combination thereof based on the zone placement, and a communication interface, coupled to the control unit, for communicating the intent zone for displaying on a device.

The present invention provides a computing system having a non-transitory computer readable medium including instructions for execution, the instructions comprising: providing a zone area including a zone segmentation; determining a zone placement of the zone area for detecting a user entry on a display interface; and providing an intent zone including a high intent area, a low intent area, or a combination thereof based on the zone placement for displaying on a device.

The present invention provides a computing system having an user interface comprising: a plurality of a zone grid aligned according to a zone segmentation of a zone area; a high intent area having the plurality of the zone grid within the zone area; a low intent area having the plurality of the zone grid within the zone area; and an intent zone including the high intent area, the low intent area, or a combination thereof for displaying on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the computing system 100 are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Figure 1:
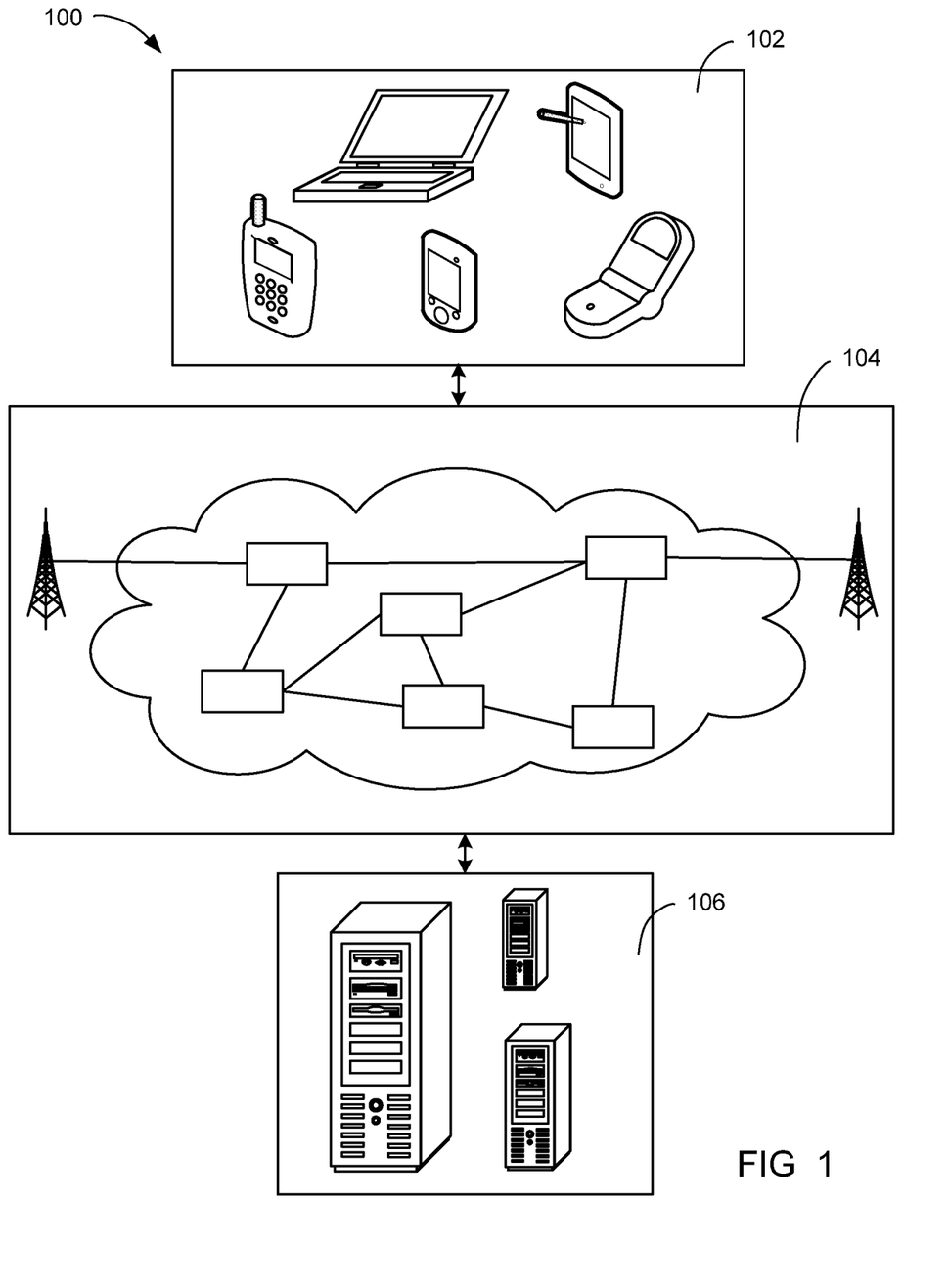
FIG. 1 is a computing system with interface mechanism in an embodiment of the present invention.

Referring now to FIG. 1, therein is shown a computing system 100 with interface mechanism in an embodiment of the present invention. The computing system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic computing system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the computing system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the first device 102 or the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the computing system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the computing system 100 is shown with the second device 106 and the first device 102 as end points of the communication path 104, although it is understood that the computing system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
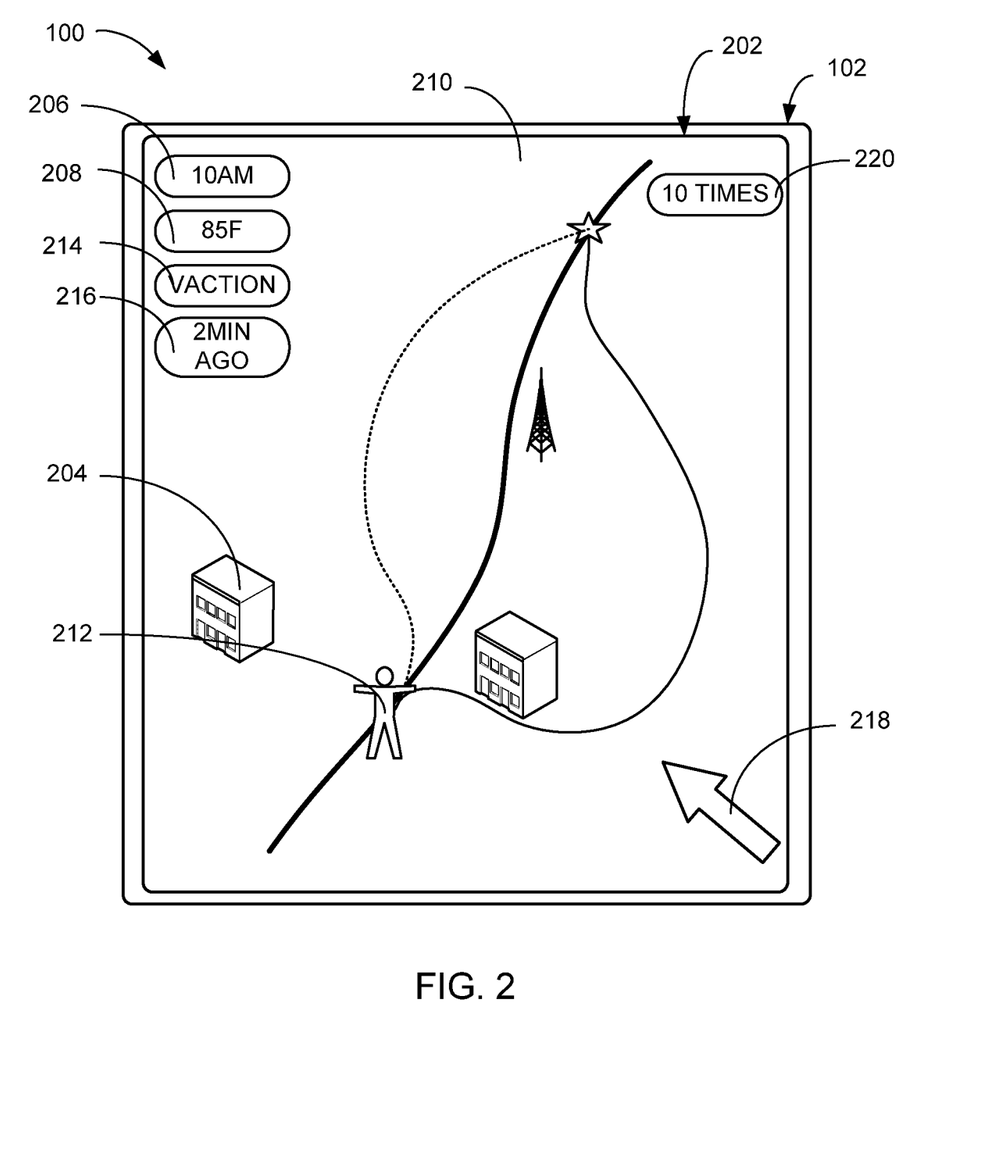
FIG. 2 is an example of an access context.

Referring now to FIG. 2, there is shown an example of an access context 202. For clarity and brevity, the discussion of the embodiment of the present invention will focus on the first device 102 delivering the result generated by the computing system 100. However, the second device 106 of FIG. 1 and the first device 102 can be discussed interchangeably.

The access context 202 is defined as a situation, circumstance, or a combination thereof surrounding the first device 102. For example, a user of the computing system 100 can access the first device 102 under the access context 202 of walking in a shopping mall on a weekend.

The access context 202 can base on a surrounding condition 204, which is defined as a factor that makes up the situation, circumstance, or a combination thereof. More specifically, a plurality of the surrounding condition 204 combined can create the access context 202 where the user of the computing system 100 can be situated.

The surrounding condition 204 can include a time period 206, a weather condition 208, a geographic area 210, a current location 212, a user's schedule 214, or a combination thereof. The time period 206 is defined as a time factor. For example, the time period 206 can include a time of day, week, month, year, season, or a combination thereof.

The weather condition 208 can include the temperature, precipitation, humidity, or a combination thereof of the geographic area 210. The geographic area 210 can represent where the current location 212 of the first device 102 is located, where the first device 102 is heading to, or a combination thereof. The current location 212 is defined as the physical location of the first device 102.

An access history 216 is defined as an activity record. For example, the access history 216 can represent a log of a user entry 218 made to the computing system 100. The user entry 218 is defined as an input made on the first device 102. For example, the user entry 218 can include manual, gesture, or a combination thereof input made by the user of the computing system 100. An entry threshold 220 is defined a limit for a number of entries. For example, the entry threshold 220 for the user entry 218 made on the first device 102 can represent a numerical value.

Figure 3:
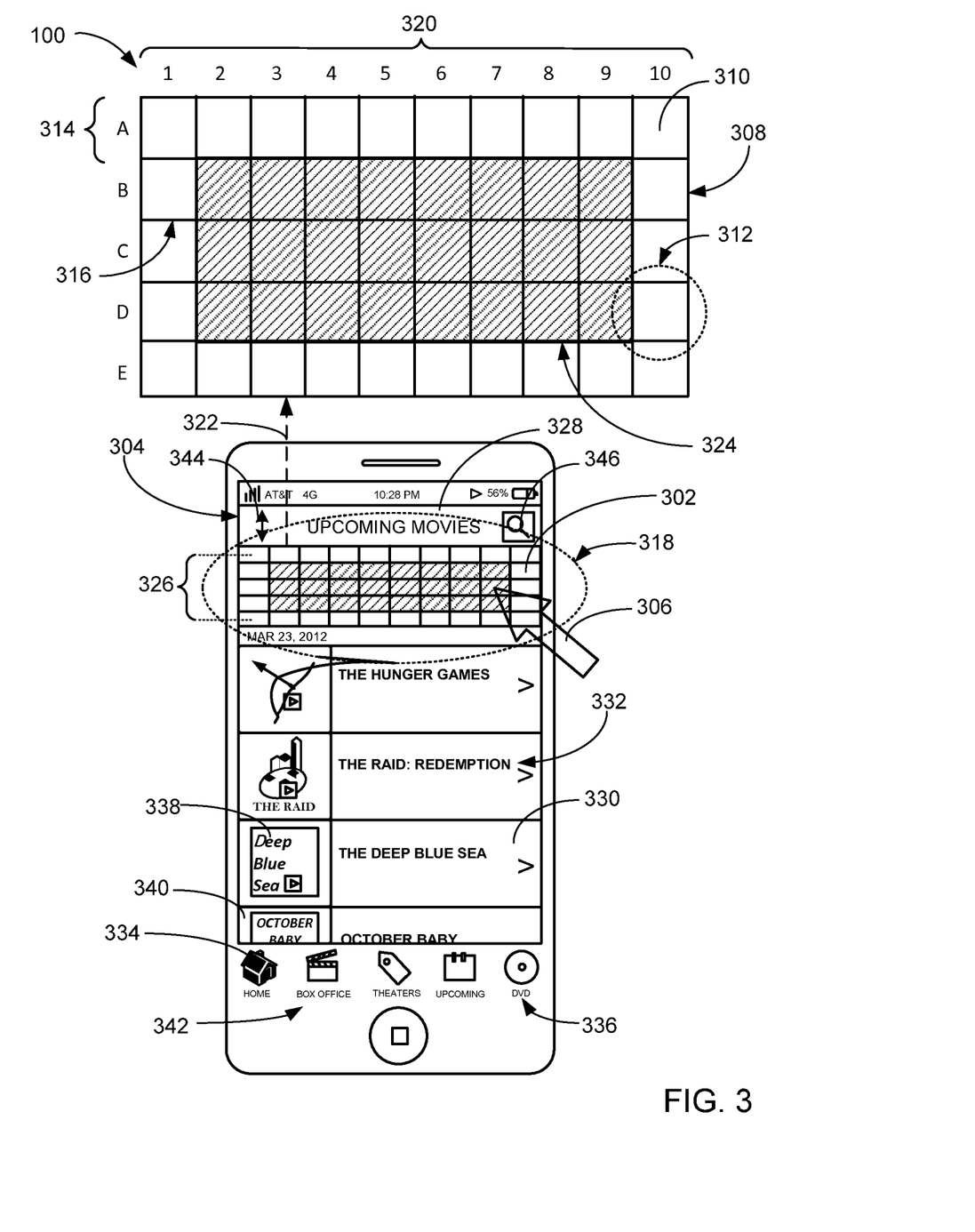
FIG. 3 is an example of an intent zone displayed on a display interface.

Referring now to FIG. 3, there is shown an example of an intent zone 302 displayed on a display interface 304. The intent zone 302 is defined as a tracking mechanism to determine a user's intent 306. The user's intent 306 is defined as willingness to make the user entry 218 of FIG. 2. For example, the user's intent 306 can include the user entry 218 made intentionally or unintentionally.

The intent zone 302 can include a zone area 308. The zone area 308 is defined as a boundary to receive the user entry 218. The zone area 308 can represent a graphical user interface. The zone area 308 can be segmented into a zone grid 310, which is defined as a subsection of the zone area 308. The zone grid 310 can have a grid shape 312, a grid size 314, or a combination thereof. The grid shape 312 can represent a polygon, circle, amorphous shape, or a combination thereof. The grid size 314 is defined as a spatial dimension of the zone grid 310.

A zone segmentation 316 is defined as a pattern of how the zone area 308 is divided. For example, the zone area 308 can be segmented into rows and columns. Each row and column combination can represent the zone grid 310. More specifically, how the zone area 308 is segmented can determine the grid shape 312, the grid size 314, or a combination thereof.

For further example, a label of alphanumeric value, such as A, B, C, D, and E, can be used to label a row for the zone segmentation 316. A label of alphanumeric value, such as 1 to 10, can be used to label a column for the zone segmentation 316.

The bigger the grid size 314, the coarser the zone area 308 can be segmented. For example, the zone area 308 having the zone segmentation 316 of 5 rows by 10 columns can have the grid size 314 of the zone grid 310 that is larger than the zone area 308 having the zone segmentation 316 of 10 rows by 20 columns of the grid size 314 of the zone grid 310.

The zone area 308 can have a zone shape 318, a zone size 320, or a combination thereof. The zone shape 318 can represent a polygon, circle, amorphous shape, or a combination thereof. The zone size 320 is defined as a spatial dimension of the zone area 308. The grid shape 312 and the zone shape 318 can be same, different, or a combination thereof.

The intent zone 302 can include a zone type 322. The zone type 322 is defined as a categorization of the intent zone 302. For example, the zone type 322 can include a high intent area 324, a low intent area 326, or a combination thereof. The high intent area 324 is defined as the zone area 308 where the user entry 218 is determined to be intentional. The low intent area 326 is defined as the zone area 308 where the user entry 218 is determined to be unintentional.

A zone placement 328 is defined as a location of where the intent zone 302 is placed. For example, the zone placement 328 can be specified by a display dimension 330 of a notification 332, an application 334, the display interface 304, or a combination thereof. The display dimension 330 is defined as a spatial area for presenting content on the first device 102.

The notification 332 is defined as information presented by the computing system 100. For example, the notification 332 can include a notification type 336. The notification type 336 is defined as a categorization of the notification 332. For example, the notification type 336 can include an advertisement, banner, or a combination thereof. For further example, the notification type 336 can include a rich media 338, a static media 340, or a combination thereof. The rich media 338 can represent the notification 332 having an image, a video, or a combination thereof that can elicit the user entry 218 to expose a full content of the notification 332. In contrast, the static media 340 can represent the notification 332 can expose the full content without an interaction with the user.

The application 334 is defined as functionality invoked on the first device 102. For example, the application 334 can include an application type 342, which is defined as the categorization of the application 334. For example, the application type 342 can include software application, widgets, or a combination thereof.

An access trend 344 is defined as a tendency of the user entry 218. For example, the access trend 344 can represent the tendency of the user entry 218 made in the zone area 308 of the intent zone 302 increases if the high intent area 324 is place between columns 4 to 7. For further example, the access trend 344 can represent the tendency of the user entry 218 for the notification type 336, the application type 342, or a combination thereof decreases if the zone size 320 of the low intent area 326 is larger than the zone size 320 of the high intent area 324. For another example, the access trend 344 can represent a tendency for a plurality of the user entry 218 made by a single user, multiple users, or a combination thereof.

A design feature 346 is defined as a functionality provided by the application 334. For example, the application 334 can include the design feature 346 to rotate a plurality of the notification 332 to be displayed on the display interface 304. For a different example, the design feature 346 can include a frequency, a timing, or a combination thereof of when, where, how often, or a combination thereof the notification 332 should be displayed.

Figure 4:
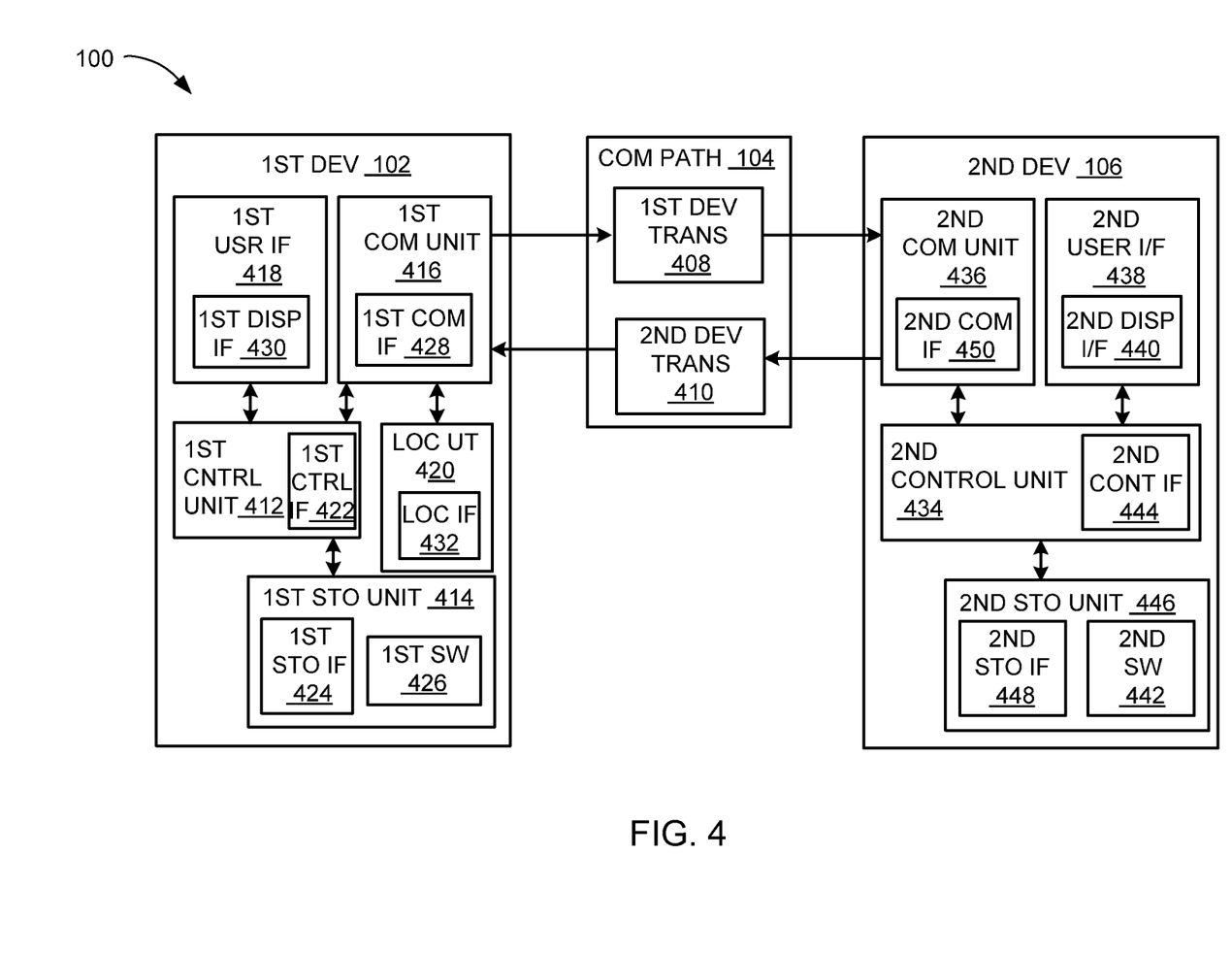
FIG. 4 is an exemplary block diagram of the computing system.

Referring now to FIG. 4, therein is shown an exemplary block diagram of the computing system 100. The computing system 100 can include the first device 102, the communication path 104, and the second device 106. The first device 102 can send information in a first device transmission 408 over the communication path 104 to the second device 106.

The second device 106 can send information in a second device transmission 410 over the communication path 104 to the first device 102.

For illustrative purposes, the computing system 100 is shown with the first device 102 as a client device, although it is understood that the computing system 100 can have the first device 102 as a different type of device. For example, the first device 102 can be a server.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the computing system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations physically separate from the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial computing system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations physically separate from the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations physically separate from the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, a camera, or any combination thereof to provide data and communication inputs.

The first user interface 418 can include a first display interface 430. The first display interface 430 can include a display, a projector, a video screen, a speaker, a headset, or any combination thereof.

The first control unit 412 can operate the first user interface 418 to display information generated by the computing system 100. The first control unit 412 can also execute the first software 426 for the other functions of the computing system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, a camera, or any combination thereof to provide data and communication inputs. Examples of the output device of the second user interface 438 can include a second display interface 440. The second display interface 440 can include a display, a projector, a video screen, a speaker, a headset, or any combination thereof.

The second control unit 434 can execute a second software 442 to provide the intelligence of the second device 106 of the computing system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the computing system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations physically separate from the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the computing system 100 is shown with the second storage unit 446 as a single hierarchy storage system, although it is understood that the computing system 100 can have the second storage unit 446 in a different configuration. For example, the second storage unit 446 can be formed with different storage technologies forming a memory hierarchical system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations physically separate from the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The computing system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the computing system 100 is described by operation of the first device 102 and the second device 106. It is understood that the first device 102 and the second device 106 can operate any of the modules and functions of the computing system 100. For example, the first device 102 is described to operate the location unit 420, although it is understood that the second device 106 can also operate the location unit 420.

Figure 5:
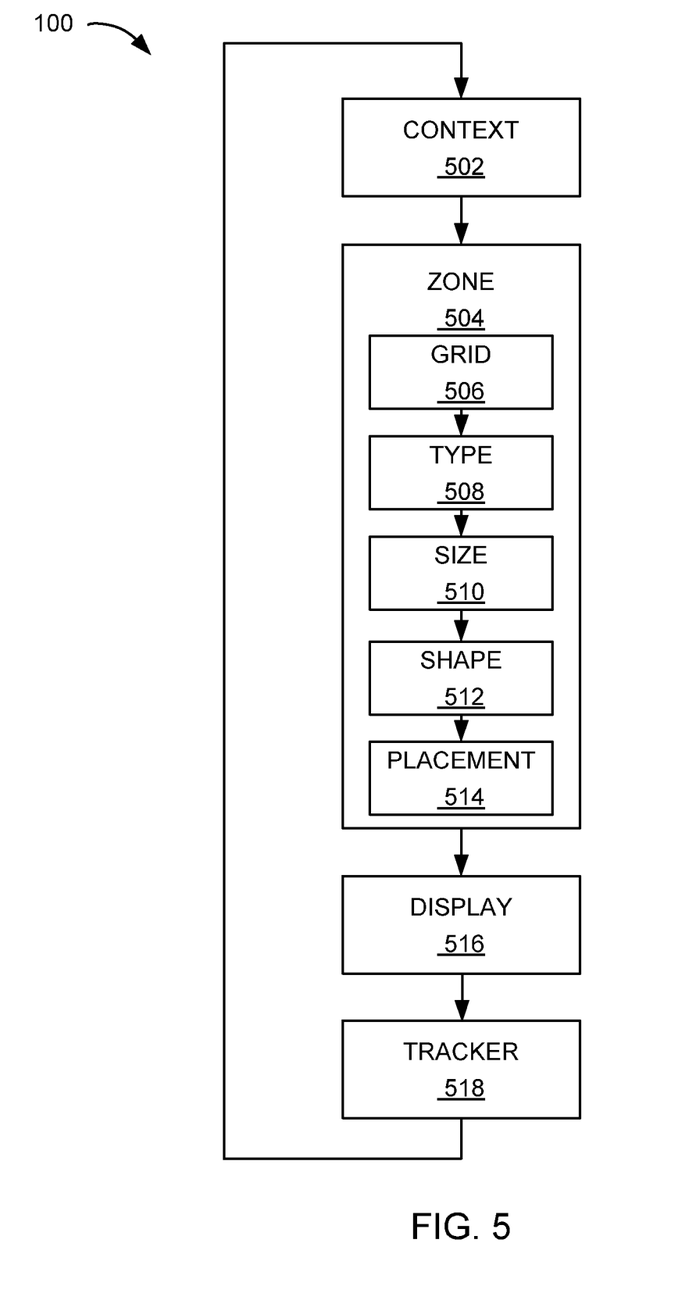
FIG. 5 is a control flow of the computing system.

Referring now to FIG. 5, therein is shown a control flow of the computing system 100. The computing system 100 can include a context module 502. The context module 502 determines the access context 202 of FIG. 2. For example, the context module 502 can determine the access context 202 based on the surrounding condition 204 of FIG. 2.

The context module 502 can determine the access context 202 in a number of ways. For example, the context module 502 can determine the access context 202 based on the surrounding condition 204 based on the surrounding condition 204 representing the time period 206 of FIG. 2. More specifically, the time period 206 can represent daytime or nighttime. As a result, the context module 502 can determine that the access context 202 of the user of the computing system 100 accessing the first device 102 can represent the time period 206 of daytime or nighttime.

For another example, the time period 206 can represent the holiday season. More specifically, the holiday season can represent Christmas. As a result, the context module 502 can determine that the access context 202 of the user of the computing system 100 accessing the first device 102 can represent the time period 206 of Christmas.

For a different example, the context module 502 can determine the access context 202 based on the surrounding condition 204 representing the weather condition 208 of FIG. 2. More specifically, the weather condition 208 can represent subzero temperature, snowing, or a combination thereof. As a result, the context module 502 can determine the access context 202 of the user of the computing system 100 accessing the first device 102 can represent the weather condition 208 of subzero temperature in the snow.

For a different example, the context module 502 can determine the access context 202 based on the surrounding condition 204 representing the geographic area 210 of FIG. 2, the current location 212 of FIG. 2, the user's schedule 214 of FIG. 2, or a combination thereof. More specifically, the current location 212 can indicate that the user is in a shopping mall. The context module 502 can determine the access context 202 of the user of the computing system 100 is at the shopping mall shopping.

For another example, the geographic area 210 can represent vacation spot, such as Hawaii. The user's schedule 214 can indicate that user is on vacation for the time period 206. As a result, the context module 502 can determine the access context 202 of the user of the computing system 100 on vacation in Hawaii. The context module 502 can communicate the access context 202 to a zone module 504.

The computing system 100 can include the zone module 504, which can couple to the context module 502. The zone module 504 generates the intent zone 302 of FIG. 3. For example, the zone module 504 can generate the intent zone 302 based on the zone type 322 of FIG. 3 including the high intent area 324 of FIG. 3, the low intent area 326 of FIG. 3, or a combination thereof.

The zone module 504 can generate the intent zone 302 in a number of ways. The zone module 504 can include a grid module 506. The grid module 506 provides the zone area 308 of FIG. 3. For example, the grid module 506 can provide the zone area 308 including the zone grid 310 of FIG. 3.

The grid module 506 can provide the zone area 308 in a number of ways. For example, the grid module 506 can provide the zone area 308 including a plurality of the zone grid 310. More specifically, the grid module 506 can provide the zone area 308 by segmenting the zone area 308 into the plurality of zone grid 310.

For a specific example, the grid module 506 can provide the zone area 308 based on the zone segmentation 316 of FIG. 3. As an example, the grid module 506 can segment the zone area 308 into the zone segmentation 316 representing 5 by 10 dimension. More specifically, the grid module 506 can provide the zone segmentation 316 including 5 rows and 10 columns. The grid module 506 can provide each rows and columns comprised as the zone grid 310.

For further example, each rows and columns of the zone segmentation 316 can be labeled to indicate specific instance of the zone grid 310 as illustrated in FIG. 3. As an example, the 5 rows can be labeled as A to E and 10 columns can be labeled 1 to 10. The label can represent alphanumeric value. The grid module 506 can provide the zone area 308 having the zone grid 310 at row A and column 8 of the zone area 308 for example.

For further example, the grid module 506 can provide the zone area 308 in a plurality of variation for the zone segmentation 316. More specifically, by adjusting the grid size 314 of FIG. 3 of the zone grid 310, the grid module 506 can update the zone segmentation 316. For example, by increasing the grid size 314, the grid module 506 can change the zone segmentation 316 to 3 by 6 dimension. In contrast, by decreasing the grid size 314, the grid module 506 can change the zone segmentation 316 to 10 by 20 dimension.

For further example, the grid module 506 can determine the grid shape 312 of FIG. 3 of the zone grid 310 based on segmenting the zone area 308. More specifically, the grid module 506 can determine the grid shape 312 to represent a square if the grid module 506 segments the width and height of the zone grid 310 having a same length. In contrast, the grid module 506 can determine the grid shape 312 to represent a rectangle if the grid module 506 segments the width and height of the zone grid 310 having a different length.

For further example, the grid module 506 can update the zone segmentation 316 based on the access context 202. For example, the access context 202 can represent subzero temperature outside. To improve selection on the display interface 304 of FIG. 3, the grid module 506 can update the zone area 308 by updating the zone segmentation 316. More specifically, the grid module 506 can increase the grid size 314 to enlarge the zone grid 310 forming the zone area 308 to improve detection of the user entry 218 of FIG. 2. The grid module 506 can dynamically update the zone segmentation 316 based on the change in the access context 202. The grid module 506 can communicate the zone area 308 to a type module 508.

The zone module 504 can include the type module 508, which can couple to the grid module 506. The type module 508 determines the zone type 322. For example, the type module 508 can determine the zone type 322 of the zone area 308 based on the access history 216 of FIG. 2.

For specific example, the type module 508 can determine the zone type 322 representing the high intent area 324, the low intent area 326, or a combination thereof. More specifically, the access history 216 can indicate that the zone area 308 representing rows B to D and columns 2 to 9 has received most numbers of the user entry 218. Based on the access history 216, the type module 508 can determine the zone area 308 with the zone grid 310 having the number of the user entry 218 meeting or exceeding the entry threshold 220 of FIG. 2 to represent the high intent area 324. For further example, the type module 508 can determine the zone type 322 for the zone grid 310 receiving a number of the user entry 218 below the entry threshold 220 to represent the low intent area 326 based on the access history 216. The type module 508 can communicate the zone type 322 to a size module 510.

It has been discovered that the navigation system 100 determining the zone type 332 of the high intent area 324, the low intent area 326, or a combination thereof can improve the efficiency of discovering and eliminating the user entry 218 that is a false-positive. As a result, the navigation system 100 can improve the accuracy of determining the user entry 218 relevant for enhanced monetization from the notification 332 of FIG. 3 selected.

The zone module 504 can include the size module 510, which can couple to the type module 508. The size module 510 determines the zone size 320 of FIG. 3. For example, the size module 510 can determine the zone size 320 based on the zone type 322.

The size module 510 can determine the zone size 320 in a number of ways. For example, the size module 510 can determine the zone size 320 based on the display dimension 330 of FIG. 3 of the application 334 of FIG. 3. More specifically, the application 334 can be displayed on the display interface 304 when the first device 102 invokes the application 334. The display dimension 330 can indicate the zone area 308 where the notification 332 can be presented. The size module 510 can determine the zone size 320 based on the display dimension 330 indicated by the application 334.

For another example, the size module 510 can determine the zone size 320 based on the display dimension 330 of the display interface 304. As an example, the display dimension 330 of the display interface 304 can represent 3 inch width by 5 inch height. The size module 510 can determine the zone size 320 to range from 0.1 to 3 inch in width and 0.1 to 5 inch in height based on the display dimension 330 of the display interface 304.

For further example, the size module 510 can determine the zone size 320 for the zone type 322. More specifically, the size module 510 can determine the zone size 320 for the high intent area 324, the low intent area 326, or a combination thereof. As an example, the size module 510 can determine the zone size 320 based on the notification type 336 of FIG. 3, the access history 216, the application type 342 of FIG. 3, the access context 202, or a combination thereof.

More specifically, the size module 510 can determine the zone size 320 of the high intent area 324, the low intent area 326, or a combination thereof based on the notification type 336. The notification type 336 can include the rich media 338 of FIG. 3, the static media 340 of FIG. 3, or a combination thereof.

For example, the size module 510 can determine the zone size 320 for the rich media 338 to be different from the zone size 320 for the static media 340. As an example, the size module 510 can determine the zone size 320 for the rich media 338 to be larger than the zone size 320 for the static media 340 to improve the detection of the user entry 218. More specifically, the size module 510 can determine the zone size 320 for the high intent area 324 for the rich media 338 to be larger than the zone size 320 for the low intent area 326 to improve access, detection, or a combination thereof the user entry 218.

For another example, the size module 510 can determine the zone size 320 of the high intent area 324, the low intent area 326, or a combination thereof based on the access history 216. The access history 216 can indicate that the user having difficulty selecting the notification 332 displayed on the display interface 304. The size module 510 can increase the zone size 320 for the high intent area 324 and decrease the zone size 320 for the low intent area 326 to improve detecting the user entry 218 for selecting the notification 332. In contrast, the size module 510 can decrease the zone size 320 for the high intent area 324 and increase the zone size 320 for the low intent area 326 to avoid over detection of the user entry 218 for selecting the notification 332.

For another example, the size module 510 can determine the zone size 320 of the high intent area 324, the low intent area 326, or a combination thereof based on the application type 342. The application type 342 can represent the application 334 for computer game. More specifically, the application 334 can require frequent and plurality of the user entry 218. To avoid over detection of the user entry 218, the size module 510 can decrease the zone size 320 for the high intent area 324 and increase the zone size 320 for the low intent area 326. In contrast, if the application type 342 does not require frequent entry, the size module 510 can increase the zone size 320 for the high intent area 324 and decrease the zone size 320 for the low intent area 326.

For another example, the size module 510 can determine the zone size 320 of the high intent area 324, the low intent area 326, or a combination thereof based on the access context 202. The access context 202 can represent the current location 212 of the first device 102 in a cold weather. Under the access context 202, the access history 216 can indicate that the user having trouble selecting the notification 332 displayed on the display interface 304. Based on the access context 202, the size module 510 can increase the zone size 320 for the high intent area 324 and decrease the zone size 320 for the low intent area 326 to improve the detection of the user entry 218. In contrast, the size module 510 can decrease the zone size 320 for the high intent area 324 and increase the zone size 320 for the low intent area 326 if the access context 202 representing a warm weather or above subzero temperature. The size module 510 can communicate the zone size 320 to a shape module 512.

The zone module 504 can include the shape module 512, which can couple to the size module 510. The shape module 512 determines the zone shape 318 of FIG. 3. For example, the shape module 512 can determine the zone shape 318 based on zone grid 310.

The shape module 512 can determine the zone shape 318 in a number of ways. For example, the shape module 512 can determine the zone shape 318 of the zone area 308. More specifically, the shape module 512 can determine the zone shape 318 based on a plurality of the zone grid 310. For example, by the shape module 512 aligning one instance of the zone grid 310 to be adjacent to another instance of the zone grid 310, the shape module 512 can determine the zone shape 318 of the zone area 308.

For a specific example, the grid shape 312 of the zone grid 310 can represent a square. The shape module 512 can determine the zone shape 318 to represent a square if the shape module 512 aligns equal number of instances of zone grid 310 with the grid shape 312 of a square for the rows and the columns for the zone segmentation 316. In contrast, the shape module 512 can determine the zone shape 318 of a rectangle if the shape module 512 aligns unequal number of instances of zone grid 310 for the rows and the columns for the zone segmentation 316.

For further example, the shape module 512 can determine the zone shape 318 based on the zone type 322. More specifically, the shape module 512 can determine the zone shape 318 of the high intent area 324, the low intent area 326, or a combination thereof. As an example, the shape module 512 can determine the zone shape 318 of the high intent area 324 similarly as determining the zone shape 318 of the zone area 308 as discussed above.

The shape module 512 can determine the zone shape 318 of the low intent area 326 by aligning the zone grid 310, outside of the high intent area 324, adjacent to each other. More specifically, the shape module 512 can determine the zone shape 318 of the low intent area 326 to represent a shape that surrounds the high intent area 324. In contrast, the shape module 512 can also determine the zone shape 318 of the high intent area 324 to represent a shape that surrounds the low intent area 326. For further example, the shape module 512 can determine the zone shape 318 of the high intent area 324 and the zone shape 318 of the low intent area 326 to have the zone shape 318 that is same, different, or a combination thereof.

For another example, the shape module 512 can determine the zone shape 318 based on the notification type 336, the access history 216, the application type 342, the access context 202, or a combination thereof. For a specific example, the shape module 512 can determine the zone shape 318 for the rich media 338 to be different from the zone shape 318 for the static media 340 to improve the detection of the user entry 218.

As an example, the access history 216 can indicate that the zone shape 318 representing a square for the rich media 338 having a higher likelihood of the user selecting the notification 332 than the zone shape 318 representing a rectangle. As a result, the shape module 512 can determine the zone shape 318 for the rich media 338 to represent a square.

In contrast, the access history 216 for the static media 340 can indicate that the zone shape 318 of a circle can have a higher number of the user entry 218 than the zone shape 318 of a polygon. As a result, the shape module 512 can determine the zone shape 318 to represent a circle.

For a different example, the application 334 can have the display dimension 330 of a square. As a result, based on display dimension 330 of the application type 342, the shape module 512 can determine the zone shape 318 of the zone area 308. For another example, the access history 216 can indicate that the zone shape 318 of a rectangle detected higher likelihood of the user entry 218 for the access context 202 of night than the zone shape 318 of a square. As a result, the shape module 512 can determine the zone shape 318 to represent a rectangle for the access context 202 of night. The shape module 512 can communicate the zone shape 318 to a placement module 514.

The zone module 504 can include the placement module 514, which can couple to the shape module 512. The placement module 514 determines the zone placement 328 of FIG. 3. For example, the placement module 514 can determine the zone placement 328 based on the zone size 320, the zone shape 318, the zone type 322, or a combination thereof.

The placement module 514 can determine the zone placement 328 in a number of ways. For example, the placement module 514 can determine the zone placement 328 based on the zone type 322 representing the high intent area 324, the low intent area 326, or a combination thereof. More specifically, the placement module 514 can determine the zone placement 328 of the low intent area 326 to surround the high intent area 324. Moreover, the placement module 514 can provide a plurality of the zone grid 310 for the low intent area 326 to be placed along the outer fringe of the high intent area 324.

For a different example, the zone size 320 of the high intent area 324 and the zone size 320 of the low intent area 326 can be the same. The placement module 514 can determine the zone placement 328 of the high intent area 324 and the low intent area 326 to be adjacent to each other.

For a different example, the zone area 308 of the intent zone 302 can include a plurality of the high intent area 324, a plurality of the low intent area 326, or a combination thereof. The placement module 514 can randomly place each instances of the high intent area 324 and the low intent area 326 within the zone area 308. The placement module 514 can determine the zone placement 328 of a plurality of the high intent area 324 to be placed at four corners of the zone area 308 having the zone shape 318 of a rectangle.

For another example, the placement module 514 can determine the zone placement 328 based on the notification type 336, the access history 216, the application type 342, the access context 202, or a combination thereof. The notification type 336 can represent an advertisement for a coupon. The access history 216 for the notification type 336 of a coupon can indicate that the likelihood of the user entry 218 is higher if the zone placement 328 of the high intent area 324 to be located at rows B to E and columns 4 to 6. As a result, the placement module 514 can determine the zone placement 328 for the high intent area 324 to be at rows B to E and columns 4 to 6 of the zone area 308.

For a different example, the placement module 514 can determine the zone placement 328 based on the display dimension 330 for the application type 342, the display interface 304, or a combination thereof. The display dimension 330 for the application 334 can be designated at the top one fifth of the display dimension 330 of the display interface 304. The placement module 514 can determine the zone placement 328 of the zone area 308 to be at the top one fifth of the display dimension 330 of the display interface 304.

For another example, the placement module 514 can determine the zone placement 328 based on the access context 202. The access history 216 can indicate that the likelihood of detecting the user entry 218 increases if the zone placement 328 of the high intent area 324 is between columns 7 to 10 if the access context 202 represents a subzero temperature. If the access context 202 represents a temperature of 30 degrees Celsius, the likelihood of detecting the user entry 218 increases if the zone placement 328 of the high intent area 324 is between columns 1 to 4. As a result, the placement module 514 can determine the zone placement 328 based on the access context 202 to improve the detection of the user entry 218.

It has been discovered that the computing system 100 determining the zone placement 328 of the intent zone 302 improves the detection of the user entry 218. By determining the zone placement 328 of the intent zone 302 based on the notification type 336, the access history 216, the application type 342, the access context 202, or a combination thereof, the computing system 100 improves the detection whether the user entry 218 was intentional or unintentional. As a result, the computing system 100 can improve the delivery of the notification 332 for enhancing the monetization of the entity providing the notification 332.

For another example, the placement module 514 can determine the zone placement 328 based on the design feature 346 of FIG. 3. More specifically, the design feature 346 can represent a rotation of a plurality of the notification 332 displayed on the display interface 304. For example, the placement module 514 can rotate a variety of the notification 332 representing a banner 3 times based on the design feature 346.

For further example, based on the design feature 346, the notification type 336, or a combination thereof, the placement module 514 can determine a plurality of the zone placement 328 different for each rotation. More specifically, as discussed above, based on the notification type 336, the placement module 514 can determine the zone placement 328. As the notification type 336 displayed changes based on the design feature 346, the placement module 514 can determine the zone placement 328 suited for the notification type 336. The zone module 504 can communicate the intent zone 302 to a display module 516.

The computing system 100 can include the display module 516. The display module 516 provides the intent zone 302. For example, the display module 516 can provide the intent zone 302 based on the zone size 320, the zone shape 318, the zone placement 328, or a combination thereof.

More specifically, the display module 516 can provide the intent zone 302 on the display interface 304 as indicated by the zone size 320, the zone shape 318, the zone placement 328, or a combination thereof. The display module 516 can communicate the intent zone 302 to a tracker module 518.

The computing system 100 can include the tracker module 518, which can couple to the display module 516. The tracker module 518 generates the access history 216. For example, the tracker module 518 can generate the access history 216 based on tracking the user entry 218.

The tracker module 518 can generate the access history 216 in a number of ways. For example, the tracker module 518 can generate the access history 216 based on tracking the user entry 218 made on the intent zone 302. More specifically, the tracker module 518 can generate the access history 216 for the notification type 336, the application type 342, the access context 202, or a combination thereof.

For a specific example, the tracker module 518 can generate the access history 216 by tracking the user entry 218 made to a specific instance of the zone type 322. As an example, the tracker module 518 can generate the access history 216 representing a frequency of the user entry 218 made to the high intent area 324, the low intent area 326, or a combination thereof.

For further example, the tracker module 518 can determine the user's intent 306 of FIG. 3 based on the user entry 218 made on the intent zone 302. More specifically, if the user entry 218 is made to the high intent area 324, the tracker module 518 can determine that the user's intent 306 was to select the notification type 336, the application type 342, or a combination thereof displayed on the display interface 304. In contrast, if the user entry 218 is made on the low intent area 326, the tracker module 518 can determine that the user's intent 306 did not intend to select the notification type 336, the application type 342, or a combination thereof displayed on the display interface 304.

For further example, based on the access history 216, the tracker module 518 can generate the access trend 344 of FIG. 3. More specifically, the tracker module 518 can generate the access trend 344 for the notification type 336, the application type 342, the access context 202 based on the user entry 218 made to the high intent area 324, the low intent area 326, or a combination thereof. As an example, by tracking the user entry 218 made on the high intent area 324, the tracker module 518 can extrapolate the access trend 344 for the user's intent 306 intended to select the notification type 336, the application type 342, or a combination thereof. The tracker module 518 can generate the access trend 344 reflecting the click through rate for the notification type 336, the application type 342, or a combination thereof.

In contrast, by tracking the user entry 218 made on the low intent area 326, the tracker module 518 can generate the access trend 344 for the user's intent 306 to not intend the selection of the notification type 336, the application type 342, or a combination thereof. More specifically, the tracker module 518 can determine the user entry 218 as fat finger rather than an intentional selection of the notification type 336, the application type 342, or a combination thereof.

For illustrative purposes, the computing system 100 is described by the zone module 504 generating the intent zone 302 although the zone module 504 can be operated differently. For example, the zone module 504 can update the intent zone 302 based on the access trend 344.

The zone module 504 can update the intent zone 302 in a number of ways. The access context 202 can change based on the current location 212 moving from one instance of the geographic area 210 to another instance of the geographic area 210. As a result, the zone module 504 can update the zone size 320, the zone shape 318, the zone placement 328, or a combination thereof of the intent zone 302, the high intent area 324, the low intent area 326, or a combination thereof to suit the access context 202.

For further example, as the access context 202 changes, the notification type 336 displayed on the first device 102 can change. As a result, the zone module 504 can update the zone size 320, the zone shape 318, the zone placement 328, or a combination thereof of the intent zone 302, the high intent area 324, the low intent area 326, or a combination thereof to suit the notification type 336.

For further example, the first device 102 can display a different instance of the application 334 as the user changes the application 334 accessed on the first device 102. As a result, the zone module 504 can update the zone size 320, the zone shape 318, the zone placement 328, or a combination thereof of the intent zone 302, the high intent area 324, the low intent area 326, or a combination thereof to suit the application type 342.

For further example, the zone module 504 can update the intent zone 302 based on the access trend 344. More specifically, the access trend 344 can indicate that the zone segmentation 316 for the high intent area 324 detects a number of the user entry 218 below the entry threshold 220. As a result, the zone module 504 can update the high intent area 324 to the low intent area 326 based on the access trend 344. In contrast, the zone module 504 can update the low intent area 326 to the high intent area 324 if the number of the user entry 218 made for the zone area 308 meets or exceeds the entry threshold 220.

It has been discovered that the computing system 100 updating the intent zone 302 based on the access history 216, the access trend 344, or a combination thereof improves the determination of the user's intent 306. By adjusting the zone placement 328 of the intent zone 302 including the high intent area 324, the low intent area 326, or a combination, the computing system 100 can improve the detection of the user entry 218 to be intentional or unintentional. As a result, the computing system 100 can determine the user's intent 306 for improving the delivery of the notification type 336 to the user of the computing system 100, the first device 102, or a combination thereof.

The physical transformation from changing the current location 212 results in the movement in the physical world, such as people using the first device 102, the vehicle, or a combination thereof, based on the operation of the computing system 100. As the movement in the physical world occurs, the movement itself creates additional information that is converted back into determining the access context 202, the zone size 320, the zone shape 318, the zone placement 328 of the intent zone 302 for the continued operation of the computing system 100 and to continue the movement in the physical world.

The first software 426 of FIG. 4 of the first device 102 of FIG. 4 can include the modules for the computing system 100. For example, the first software 426 can include the context module 502, the zone module 504, the display module 516, and the tracker module 518.

The first control unit 412 of FIG. 4 can execute the first software 426 for the context module 502 to determine the access context 202. The first control unit 412 can execute the first software 426 for the zone module 504 to generate the intent zone 302. The first control unit 412 can execute the first software 426 for the display module 516 to provide the intent zone 302. The first control unit 412 can execute the first software 426 for the tracker module 518 to generate the access history 216, the access trend 344, or a combination thereof.

The second software 442 of FIG. 4 of the second device 106 of FIG. 4 can include the modules for the computing system 100. For example, the second software 442 can include the context module 502, the zone module 504, the display module 516, and the tracker module 518.

The second control unit 434 of FIG. 4 can execute the second software 442 for the context module 502 to determine the access context 202. The second control unit 434 can execute the second software 442 for the zone module 504 to generate the intent zone 302. The second control unit 434 can execute the second software 442 for the display module 516 to provide the intent zone 302. The second control unit 434 can execute the second software 442 for the tracker module 518 to generate the access history 216, the access trend 344, or a combination thereof.

The modules of the computing system 100 can be partitioned between the first software 426 and the second software 442. The second software 442 can include the context module 502, the zone module 504, and the tracker module 518. The second control unit 434 can execute modules partitioned on the second software 442 as previously described.

The first software 426 can include the display module 516. Based on the size of the first storage unit 414, the first software 426 can include additional modules of the computing system 100. The first control unit 412 can execute the modules partitioned on the first software 426 as previously described.

The first control unit 412 can operate the first communication interface 428 of FIG. 4 to communicate the access context 202, the intent zone 302, the access history 216, the access trend 344, or a combination thereof to or from the second device 106 through the communication path 104 of FIG. 4. The first control unit 412 can operate the first software 426 to operate the location unit 420 of FIG. 4. The second control unit 434 can operate the second communication interface 450 of FIG. 4 to communicate the access context 202, the intent zone 302, the access history 216, the access trend 344, or a combination thereof to or from the first device 102 through the communication path 104.

The computing system 100 describes the module functions or order as an example. The modules can be partitioned differently. For example, the shape module 512 and the size module 510 can be combined. Each of the modules can operate individually and independently of the other modules. Furthermore, data generated in one module can be used by another module without being directly coupled to each other. For example, the placement module 514 can receive the zone grid 310 from the grid module 506. Further, "communicating" can represent sending, receiving, or a combination thereof the data generated to or from one to another.

The modules described in this application can be hardware implementation or hardware accelerators in the first control unit 412 or in the second control unit 434. The modules can also be hardware implementation or hardware accelerators within the first device 102 or the second device 106 but outside of the first control unit 412 or the second control unit 434, respectively as depicted in FIG. 4. However, it is understood that the first control unit 412, the second control unit 434, or a combination thereof can collectively refer to all hardware accelerators for the modules.

The modules described in this application can be implemented as instructions stored on a non-transitory computer readable medium to be executed by the first control unit 412, the second control unit 434, or a combination thereof. The non-transitory computer medium can include the first storage unit 414 of FIG. 4, the second storage unit 446 of FIG. 4, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the computing system 100 or installed as a removable portion of the computing system 100.

Figure 6:
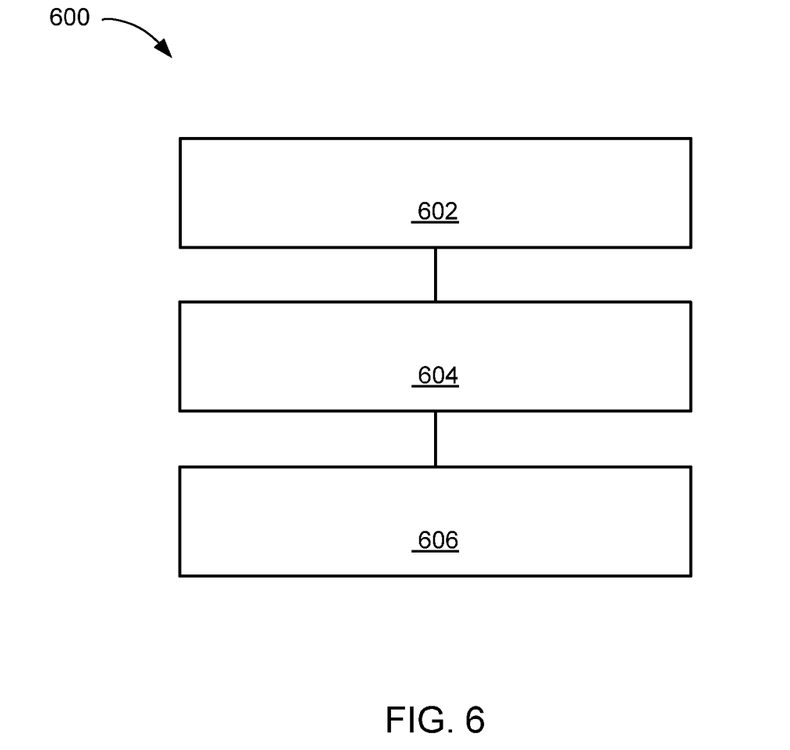
FIG. 6 is a flow chart of a method of operation of the computing system in a further embodiment of the present invention.

Referring now to FIG. 6, therein is shown a flow chart of a method 600 of operation of the computing system 100 in a further embodiment of the present invention. The method 600 includes: providing a zone area including a zone segmentation in a block 602; determining a zone placement of the zone area with a control unit for detecting a user entry on a display interface in a block 604; and providing an intent zone including a high intent area, a low intent area, or a combination thereof based on the zone placement for displaying on a device in a block 606.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a computing system comprising:
   displaying a zone area, representing a graphical user interface to receive a user entry, including a zone segmentation for segmenting into multiple instances of a zone grid;
   determining a zone type based on comparing a number of the user entry to an entry threshold wherein the zone type representing a high intent area if the number of the user entry meets or exceeds the entry threshold and the zone type representing a low intent area if the number of the user entry is below the entry threshold;
   determining a zone size based on the zone type for the high intent area having the zone size different from the low intent area;
   determining a zone placement of the zone area based on the zone size with a control unit including a processor for detecting the user entry on at least one of the zone grid of the zone area displayed on a display interface;
   providing an intent zone including the high intent area and the low intent area based on the zone placement for displaying on a device wherein the high intent area represents the zone area where the user entry is determined to be intentional and the low intent area represents the zone area where the user entry is determined to be unintentional; and
   updating the zone area based on updating the zone segmentation dynamically by changing a grid size, a grid shape, or a combination thereof of the zone grid according to a change in an access context.

2. The method as claimed in claim 1 further comprising generating an access trend based on tracking the user entry for updating the zone placement of the intent zone.

3. The method as claimed in claim 1 further comprising determining a user's intent based on detecting the user entry made on the high intent area, the low intent area, or a combination thereof.

4. The method as claimed in claim 1 wherein determining the zone placement includes determining the zone placement based on an access history for improving the zone placement of the high intent area, the low intent area, or a combination thereof.

5. The method as claimed in claim 1 further comprising updating the intent zone based on the access context for improving the zone placement of the high intent area, the low intent area, or a combination thereof.

6. A computing system comprising:
   a control unit including a processor for:
      displaying a zone area, representing a graphical user interface to receive a user entry, including a zone segmentation for segmenting into multiple instances of a zone grid,
      determining a zone type based on comparing a number of the user entry to an entry threshold wherein the zone type representing a high intent area if the number of the user entry meets or exceeds the entry threshold and the zone type representing a low intent area if the number of the user entry is below the entry threshold,
      determining a zone size based on the zone type for the high intent area having the zone size different from the low intent area,
      determining a zone placement of the zone area based on the zone size with a control unit for detecting the user entry on at least one of the zone grid of the zone area displayed on a display interface,
      providing an intent zone including the high intent area and the low intent area based on the zone placement wherein the high intent area represents the zone area where the user entry is determined to be intentional and the low intent area represents the zone area where the user entry is determined to be unintentional,
      updating the zone area based on updating the zone segmentation dynamically by changing a grid size, a grid shape, or a combination thereof of the zone grid according to a change in an access context, and
   a communication unit including a microelectronic coupled to the control unit, for communicating the intent zone for displaying on a device.

7. The system as claimed in claim 6 wherein the control unit is for generating an access trend based on tracking the user entry for updating the zone placement of the intent zone.

8. The system as claimed in claim 6 wherein the control unit is for determining a user's intent based on detecting the user entry made on the high intent area, the low intent area, or a combination thereof.

9. The system as claimed in claim 6 wherein the control unit is for determining the zone placement based on an access history for improving the zone placement of the high intent area, the low intent area, or a combination thereof.

10. The system as claimed in claim 6 wherein the control unit is for updating the intent zone based on the access context for improving the zone placement of the high intent area, the low intent area, or a combination thereof.

11. A non-transitory computer readable medium including instructions for execution, the instructions comprising:
   displaying a zone area, representing a graphical user interface to receive a user entry, including a zone segmentation for segmenting into multiple instances of a zone grid;
   determining a zone type based on comparing a number of the user entry to an entry threshold wherein the zone type representing a high intent area if the number of the user entry meets or exceeds the entry threshold and the zone type representing a low intent area if the number of the user entry is below the entry threshold;
   determining a zone size based on the zone type for the high intent area having the zone size different from the low intent area;
   determining a zone placement of the zone area based on the zone size for detecting the user entry on at least one of the zone grid of the zone area displayed on a display interface;
   providing an intent zone including the high intent area and the low intent area based on the zone placement for displaying on a device wherein the high intent area represents the zone area where the user entry is determined to be intentional and the low intent area represents the zone area where the user entry is determined to be unintentional; and
   updating the zone area based on updating the zone segmentation dynamically by changing a grid size, a grid shape, or a combination thereof of the zone grid according to a change in an access context.

12. The non-transitory computer readable medium as claimed in claim 11 further comprising generating an access trend based on tracking the user entry for updating the zone placement of the intent zone.

13. The non-transitory computer readable medium as claimed in claim 11 further comprising determining a user's intent based on detecting the user entry made on the high intent area, the low intent area, or a combination thereof.

14. The non-transitory computer readable medium as claimed in claim 11 wherein determining the zone placement includes determining the zone placement based on an access history for improving the zone placement of the high intent area, the low intent area, or a combination thereof.

15. The non-transitory computer readable medium as claimed in claim 11 further comprising updating the intent zone based on the access context for improving the zone placement of the high intent area, the low intent area, or a combination thereof.

16. A computing system including an user interface comprising:
   a plurality of a zone grid aligned according to a zone segmentation of a zone area representing a graphical user interface displayed within a display interface for detecting a user entry on at least one of the zone grid;
   a high intent area having the plurality of the zone grid within the zone area wherein the high intent area represents the zone area where the user entry is determined to be intentional further wherein a zone type representing the high intent area if a number of the user entry meets or exceeds an entry threshold;
   a low intent area having the plurality of the zone grid within the zone area wherein the low intent area represents the zone area where the user entry is determined to be unintentional further wherein the zone type representing the low intent area if the number of the user entry is below the entry threshold and the zone size of the high intent area is different from the zone size of the low intent area wherein a zone placement of the zone area is determined based on a zone size;
   an intent zone including the high intent area, the low intent area, or a combination thereof for displaying on a device; and
   wherein:
      the zone area is based on updating the zone segmentation dynamically by changing a grid size, a grid shape, or a combination thereof of the zone grid according to a change in an access context.

17. The user interface as claimed in claim 16 wherein the low intent area placed adjacent to the high intent area for detecting the user entry.

18. The user interface as claimed in claim 16 wherein the low intent area placed surrounding the high intent area for detecting the user entry.

19. The user interface as claimed in claim 16 wherein the intent zone having the zone size for displaying the intent zone within a display dimension.

20. The user interface as claimed in claim 16 wherein the intent zone having a zone shape determined by the grid shape of the zone grid.

* * * * *